United States Patent [19]
Wehmeyer et al.

[11] Patent Number: 5,867,226
[45] Date of Patent: *Feb. 2, 1999

[54] SCHEDULER EMPLOYING A PREDICTIVE AGENT FOR USE IN A TELEVISION RECEIVER

[75] Inventors: Keith Reynolds Wehmeyer, Fishers; Jeffrey Philip Reavis; Robert Howard Miller, both of Indianapolis; Sheila Renee Crosby, Carmel; Hugh Boyd Morrison, Indianapolis; Megan Louise Brown, Carmel, all of Ind.

[73] Assignee: Thomson Consumer Electronics, Inc., Indianapolis, Ind.

[*] Notice: This patent issued on a continued prosecution application filed under 37 CFR 1.53(d), and is subject to the twenty year patent term provisions of 35 U.S.C. 154(a)(2).

[21] Appl. No.: 573,113

[22] Filed: Dec. 15, 1995

Related U.S. Application Data

[60] Provisional application No. 60/006,888 Nov. 17, 1995.

[51] Int. Cl.[6] .................................................. H04N 5/445
[52] U.S. Cl. .......................... 348/563; 348/906; 348/569; 348/10
[58] Field of Search ...................................... 348/563, 564, 348/569, 570, 906, 734, 6, 7, 10, 12, 13, 461, 468, 553; 455/5.1, 4.2, 6.1, 6.2; H04N 7/173, 7/16, 5/445

[56] References Cited

U.S. PATENT DOCUMENTS

| | | | |
|---|---|---|---|
| 5,323,240 | 6/1994 | Amano et al. | 348/731 |
| 5,353,121 | 10/1994 | Young et al. | 348/188 |
| 5,465,385 | 11/1995 | Ohga | 348/6 |
| 5,534,911 | 7/1996 | Levitan | 348/10 |
| 5,673,089 | 9/1997 | Yuen et al. | 348/734 |

FOREIGN PATENT DOCUMENTS

| | | | |
|---|---|---|---|
| 0572090A2 | 12/1993 | European Pat. Off. | H04N 7/08 |
| 0662769A1 | 7/1995 | European Pat. Off. | H04N 7/10 |
| 0682452A3 | 11/1995 | European Pat. Off. | H04N 5/445 |
| WO95/01057 | 1/1995 | WIPO | H04N 7/16 |

*Primary Examiner*—Sherrie Hsia
*Attorney, Agent, or Firm*—Joseph S. Tripoli; Peter M. Emanuel; Frank Y. Liao

[57] ABSTRACT

In a television system in which at least program title information for programs which are to be transmitted in the future is transmitted in advance to form a channel guide listing, apparatus is provided for searching for specific television programs which satisfy certain criteria concerning a user's viewing preferences, and upon successful conclusion to the search, the apparatus generates a list of such television programs in order to predict for the viewer certain programs which may be of interest. In a first embodiment of the invention the apparatus stores information about the particular television shows which the user watches, as search criteria. In a second embodiment of the invention the search criteria is editable by the viewer to further refine the searches.

9 Claims, 6 Drawing Sheets

210

| NAME | COUNT | TYPE | DATE | LOCK |
|---|---|---|---|---|
| MOVIE | 7 | TOPIC | 11.15.95 | NO |
| COMEDY | 3 | THEME | 11.15.95 | NO |
| DRAMA | 4 | THEME | 09.27.95 | NO |
| THE SIMPSONS | 21 | TITLE | 10.23.95 | YES |
| | | | | |

PROGRAM GUIDE

CH 150 — 7:00pm — 7:05pm

| | |
|---|---|
| HBO 102 | OTHER PEOPLE'S MONEY |
| CBS 106 | EVENING NEWS / FRA... TUR... |
| UPN 113 | STAR TREK: VOYAG... |
| CINE 210 | CINE SATURDAY NIGHT MOVIE: ZULU / BOTH SODES |
| CNN 305 | PRIME NEWS / RELIABLE SOURCES / WORLD NEWS |
| USA 422 | COUNTER STRIKE / QUANTUM LEAP |

Pop-up (120):
- MOVIE TITLE: ZULU
- STARRING: STANLEY BAKER & MICHAEL CAINE
- PRODUCER: STANLEY BAKER
- RATING: PG-13 (VIOLENCE)
- THEME: ACTION/ADVENTURE
- REVIEW: ☆☆☆ 1/2
- PLOT: A VASTLY OUTNUMBERED COMPANY OF BRITISH SOLDIERS IN LATE 19TH CENTURY SOUTH AFRICA DEFENDS AN ISOLATED OUTPOST AGAINST AN ATTACK BY 40,000 ZULU WARRIORS.

| MORE | MOVIES | SPORTS | OTHER | ALL | EXIT |

FIG. 1

SCHEDULER EMPLOYING A PREDICTIVE AGENT FOR USE IN A TELEVISION RECEIVER

The subject non-provisional application claims priority from a copending provisional application Ser. No. 60/006,888 filed Nov. 17, 1995.

FIELD OF THE INVENTION

The subject invention concerns apparatus for scheduling the selection of a television program for watching or recording at some future date.

BACKGROUND OF THE INVENTION

The act of selecting a television program to watch has become more complicated in that the number of available channels has increased dramatically of late. For example RCA® DSS® direct broadcast satellite receivers provide as many as 150 channels to choose from. Heretofore, a user who wanted to see "what's on" could merely consult a television schedule printed in his local newspaper in the hope that he would eventually find a program which sparked his interest.

Such a practice may work well when there are only a few television channel schedules to examine, however, it is unlikely that a viewer would be able to examine the complete schedules for 150 television channels, just to see "what's on" at a given time. Such a task would be daunting even if all of the programs were to be listed by category. A viewer may find that there are only a few programs of interest to him out of the vast number of available programs. That is, the chaff outnumbers and tends to hide the wheat. Consequently, it is felt that as the number of channels increases, the chances of successfully locating a desirable program in a short time becomes more and more unlikely.

SUMMARY OF THE INVENTION

In a television system in which at least program title information for programs which are to be transmitted in the future is transmitted in advance to form a channel guide listing, apparatus is provided for searching for specific television programs which satisfy certain criteria concerning a user's viewing preferences, and upon successful conclusion to the search, the apparatus generates a list of such television programs in order to predict for the viewer certain programs which may be of interest. In a first embodiment of the invention the apparatus stores information about the particular television shows which the user watches, as search criteria. In a second embodiment of the invention the search criteria is editable by the viewer to further refine the searches.

BRIEF DESCRIPTION OF THE DRAWING

FIG. 1 is an illustration of a screen display, in accordance with an aspect of the invention.

DETAILED DESCRIPTION OF THE INVENTION

Television systems such as the RCA® DSS® direct broadcast satellite system and Starsight® transmit channel guides for display on the television receivers of subscribers.

FIG. 1 shows a Program Guide screen display 110 produced, for example, by an RCA® DSS® direct broadcast satellite receiver system, manufactured by Thomson Consumer Electronics, Inc. Indianapolis, Ind. A user selects a television program from a Program Guide for viewing, by moving a cursor (via operation of remote control up, down, right, and left, direction control keys, not shown) to a block of the program guide screen display which contains the name of the desired program. When a SELECT key of the remote control is pressed, the current x and y position of the cursor is evaluated to derive virtual channel and program time information. In this example of FIG. 1, a particular television show, CINE SATURDAY NIGHT MOVIE: ZULU has been highlighted for selection by use of the cursor keys on a remote control unit (e. g., 450R of FIG. 4). The highlighting is illustrated by the dark box outlining the title in FIG. 1. Normally, upon pressing the SELECT key, the relevant programming data is transferred to a programming unit. Note also that an auxiliary text display 120 is shown. Auxiliary text display 120 provides additional data relating to the highlighted television program. A further use for the data provided by channel guide screen 110 and auxiliary text display 120 will be described below.

Figure 2:
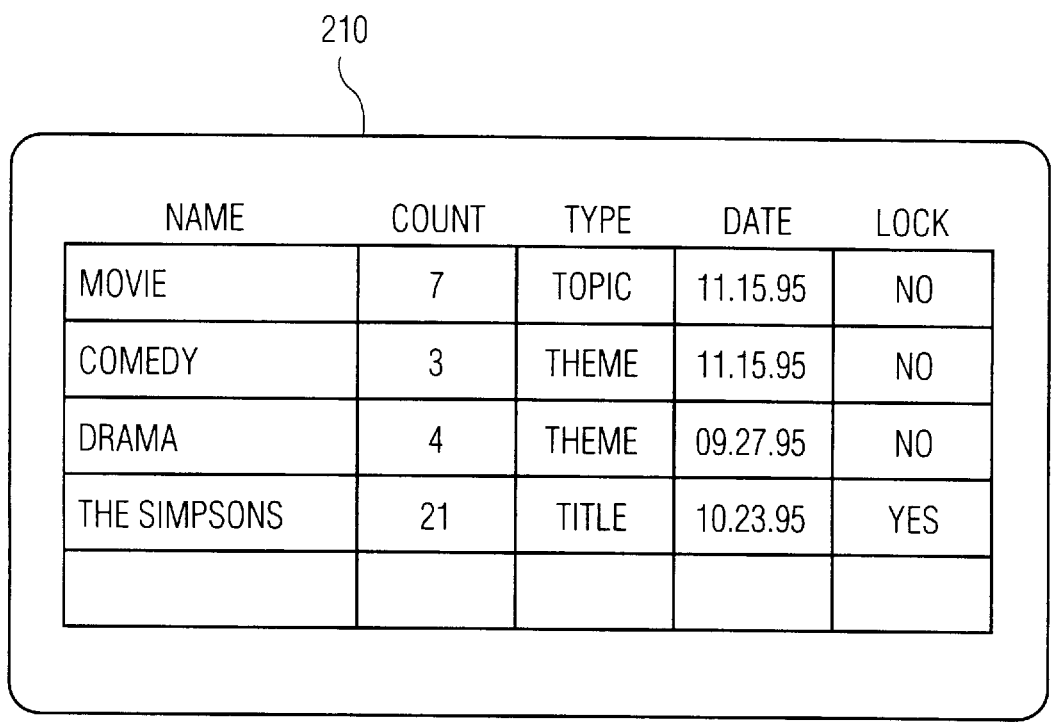
FIG. 2 is an illustration of a screen display showing a viewed item list in accordance with another aspect of the invention.

FIG. 2 shows a "predictive agent list" or "viewed item list" which may be generated as a screen display 210. Data is automatically stored in this predictive agent list by the apparatus of the invention, whenever a program is watch for a given period of time, for example, 5 or more minutes. In this way, a record is kept of the user's viewing habits so that the apparatus can be guided to make a prediction of which upcoming shows may be of interest to the viewer.

A predictive agent list 210 is illustrated in FIG. 2. In the example of FIG. 2, the viewer has watched 7 movies, (the television program type "movies" is a broad classification known as a "topic"). The last movie was watched on 15 Nov. 1995. Of these 7 movies there were three movies having the theme "comedy", and four movies having the theme "drama". The last comedy was watched on 15 Nov. 1995, and the last drama was watched on 27 Sep. 1995. The viewer also watched 21 episodes of a television program entitled "The Simpsons". Note that an indication of whether each item is locked or unlocked is also stored in the predictive agent list. A viewer may lock an item to prevent the system from automatically deleting that item, if that particular item has not been watched recently. Moreover, the user may edit the viewed item list in order to provide a better filter for the television programs to be predicted (see FIG. 6c).

Figure 3:
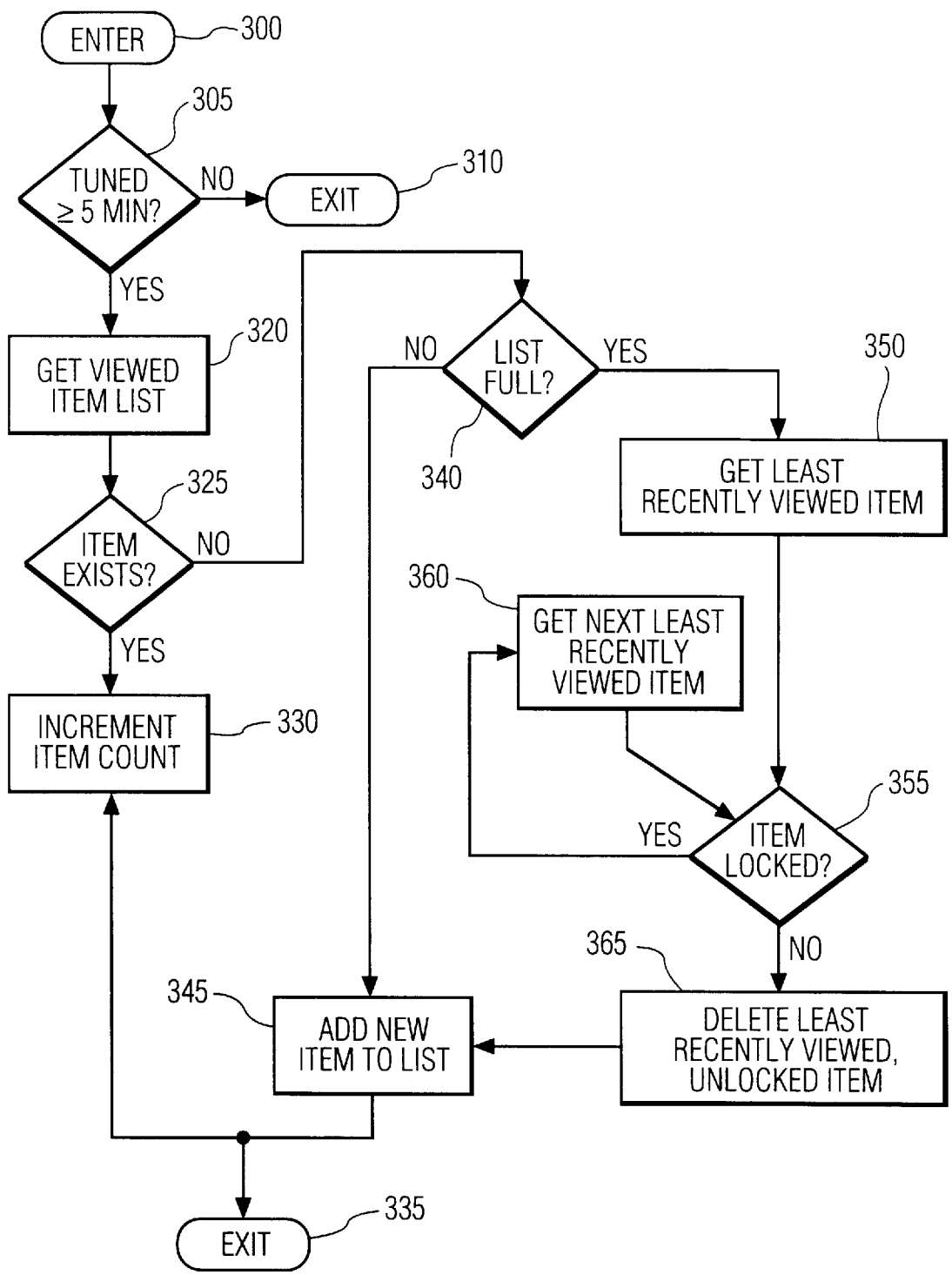
FIG. 3 is a flowchart useful in understanding the invention.

Automatic loading of the viewed item list is shown in the flowchart of FIG. 3, wherein the routine is entered at step 300. At step 305, a check is made to see if the tuner has been tuned to the current channel for at least five minutes. If not, the routine is exited at step 310. If so, the routine advances to step 320 to get the viewed item list from memory. At step 325, a check is made to see if an item matching the currently viewed television program already exists in the viewed item list. If so, the count of that item is incremented at step 330 and the routine is exited at step 335. If an item matching the currently viewed television program does not already exist in the viewed item list, then the routine advances to step 340. At step 340 a check is made to see if the list is full. If not, then data indicative of the currently viewed television program is added to the viewed item list, and the routine is exited at step 335. If, at step 340, it was determined that the viewed item list was full, then at step 350 the routine will read the least recently viewed item of the list. At step 355, a check will be made to see if that item is locked. If so, it means that the viewer does not want that item to be deleted, and the routine loops back to step 360 to get the next least recently viewed item from the list. That item will in turn be checked at step 355 to see if it is locked. If not, the routine will advance to step 365 where that item will be deleted to provide free space in the list. The routine will then advance to step 345, add the new item to the list, and exit at step 335.

Figure 5:
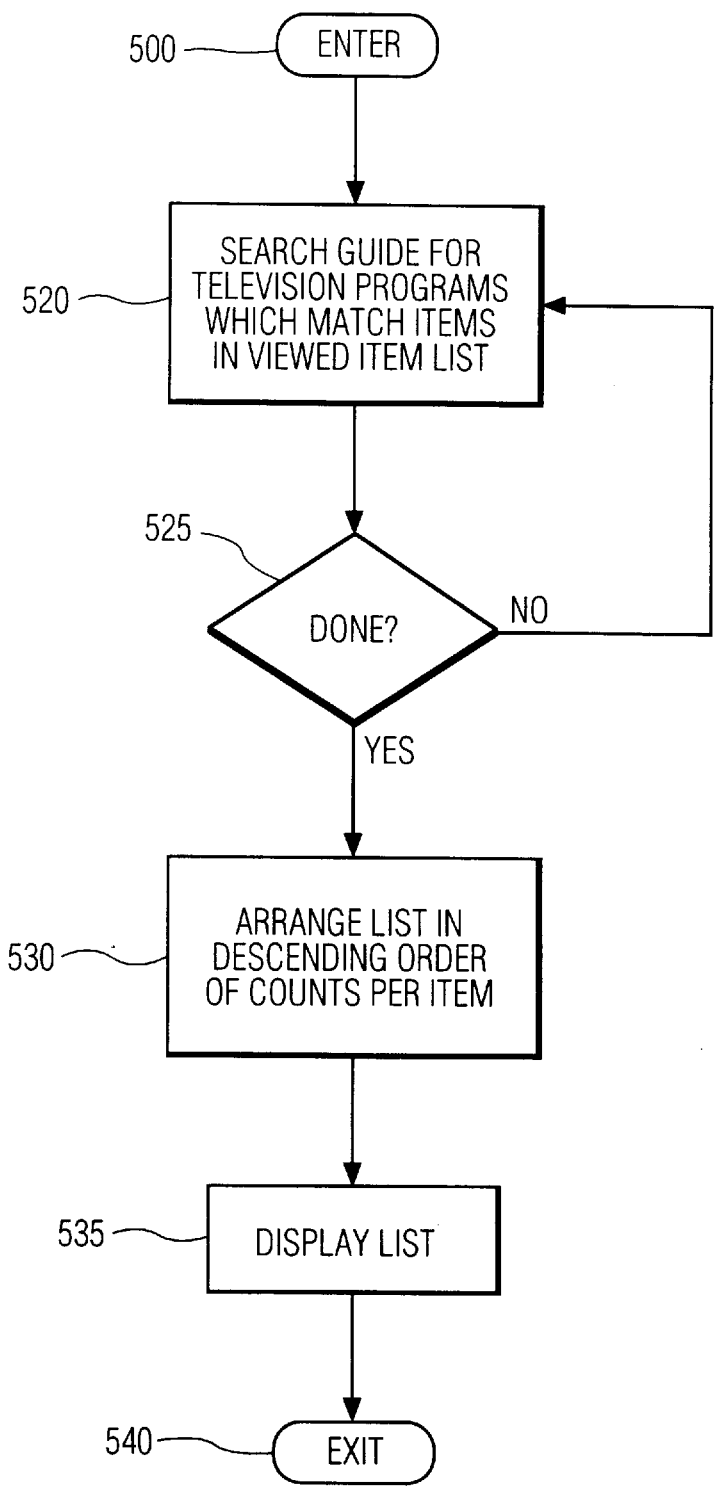
FIG. 5 is a flowchart useful in understanding the invention.
Figure 6A:
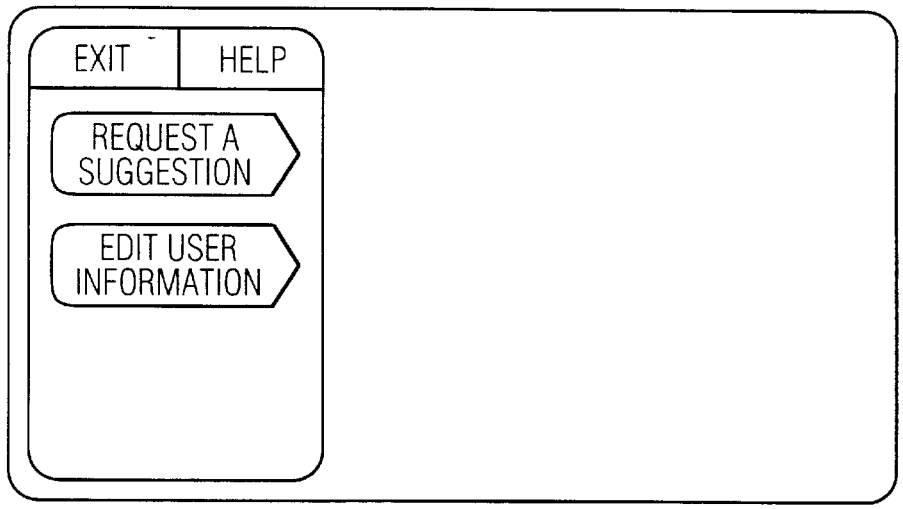
FIGS. 6a–6c are illustrations of screen displays produced in accordance with the invention.

A viewer may request a search to see "what's on" at any given time (see FIG. 6a). The result of that search will be a list of predictions of television programs which the user might find interesting. Such a list of predictions will be displayed to the user by means of an on-screen display (see FIG. 6b). The displayed list may be presented in a "weighted" fashion, for example in descending order of the number of times that a particular type of show was watched. Generation of this list of predictions is shown in the flowchart of FIG. 5.

Figure 4:
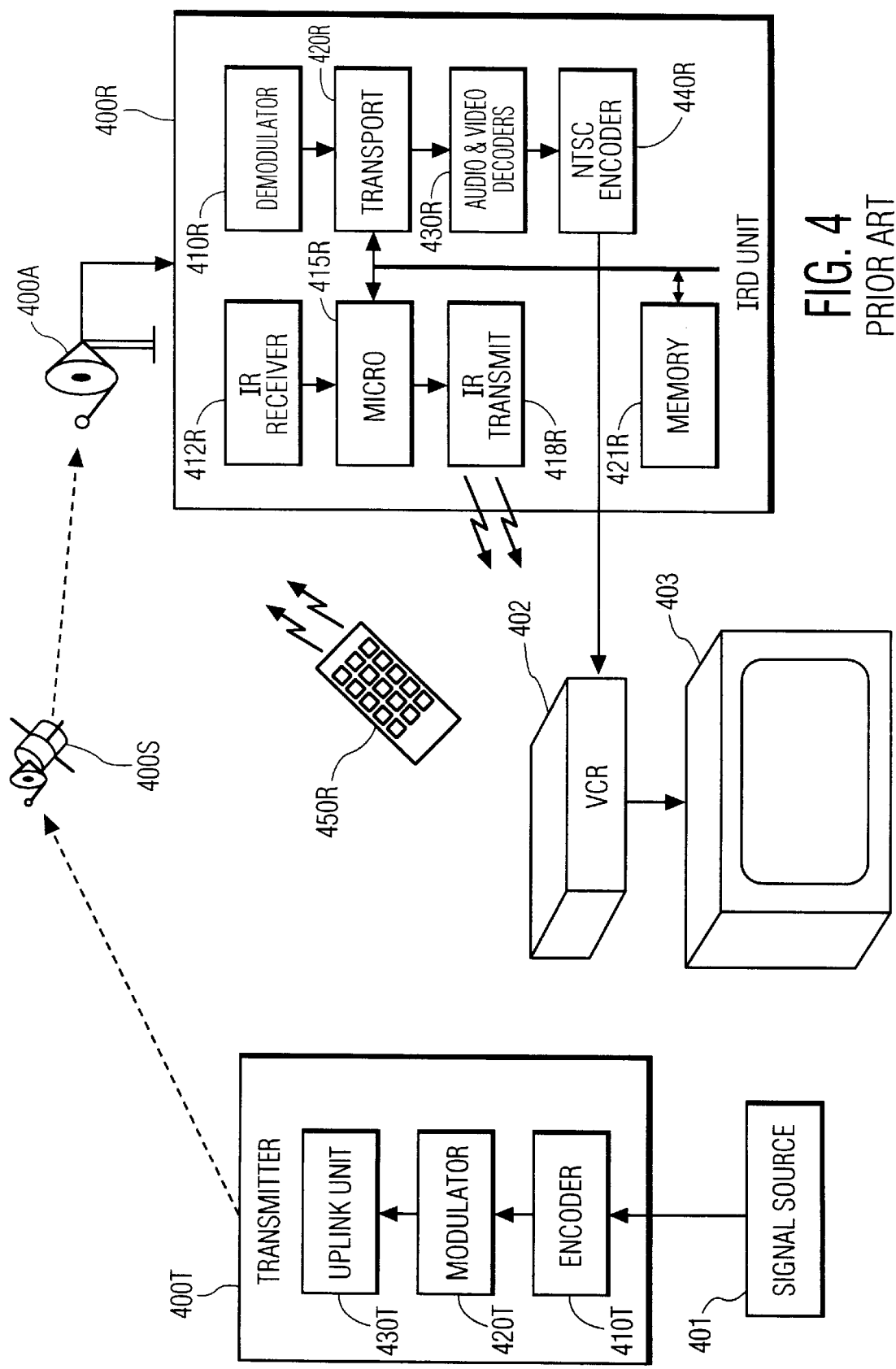
FIG. 4 is an illustration in block diagram form of apparatus suitable for use with the invention.

As noted above, the channel guide data used by the controller of the subject apparatus to form the above-described interactive or confirmation sentences may be received from a satellite television communication system. FIG. 4 shows such a satellite television communication system in which, a satellite 400S receives a signal representing audio, video, or data information from an earth-based transmitter 400T. The satellite amplifies and rebroadcasts this signal to a plurality of receivers 400R, located at the residences of consumers, via transponders operating at specified frequencies and having given bandwidths. Such a system includes an uplink transmitting portion (earth to satellite), an earth-orbiting satellite receiving and transmitting unit, and a downlink portion (satellite to earth) including a receiver located at the user's residence.

In a such a satellite system, the information necessary to select a given television program is not fixedly-programmed into each receiver but is rather is down-loaded from the satellite continually on each transponder. The television program selection information comprises a set of data known as a Master Program Guide (MPG), which relates television program titles, their start and end times, a virtual channel number to be displayed to the user, and information allocating virtual channels to transponder frequencies and to a position in the time-multiplexed data stream transmitted by a particular transponder. In such a system, it is not possible to tune any channel until the first master program guide is received from the satellite, because the receiver (IRD, or Integrated Receiver Decoder) literally does not know where any channel is located, in terms of frequency and position (i.e. data time slot) within the data stream of any transponder.

A master program guide is preferably transmitted on all transponders with the television program video and audio data, and is repeated periodically, for example, every 2 seconds. The master program guide, once received, is maintained in a memory unit in the receiver e.g., memory unit 421R in FIG. 4, and updated periodically, for example every 30 minutes. Retention of the master program guide allows instantaneous television program selection because the necessary selection data are always available. If the master program guide were to be discarded after using it to select a television program, then a delay of at least two seconds would be incurred while a new program guide was acquired, before any further television program selections could be performed.

Once the channel transponder carrying a desired television program is tuned, the data packets containing the audio and video information for that program can be selected from the data stream received from the transponder by examining the data packets for the proper SCID (Service Component Identifier) 12 bit code. If the SCID of the currently received data packet matches the SCID of the desired television program as listed in the program guide, then the data packet is routed to the proper data processing sections of the receiver. If the SCID of a particular packet does not match the SCID of the desired television program as listed in the program guide, then that data packet is discarded.

A brief description of system hardware, suitable for implementing the above-described invention, now follows. In FIG. 4, a transmitter 400T processes a data signal from a source 401 (e.g., a television signal source) and transmits it to a satellite 400S which receives and rebroadcasts the signal to a receiving antenna 400A which applies the signal to a receiver 400R. Transmitter 400T includes an encoder 410T, a modulator (i.e., modulator/forward error corrector (FEC)) 420T, and an uplink unit 430T. Encoder 410T compresses and encodes signals from source 401 according to a predetermined standard such as MPEG. MPEG is an international standard developed by the Moving Picture Expert Group of the International Standards Organization for coded representation of moving pictures and associated audio stored on digital storage medium. An encoded signal from unit 410T is supplied to modulator/Forward Error Corrector (FEC) 420T, which encodes the signal with error correction data, and Quaternary Phase Shift Key (QPSK) modulates the encoded signal onto a carrier.

Uplink unit 430T transmits the compressed and encoded signal to satellite 400S, which broadcasts the signal to a selected geographic reception area. The signal from satellite 400S is received by an antenna dish 400A coupled to an input of a so-called set-top receiver 400R (i.e., an interface device situated atop a television receiver). Receiver 400R includes a demodulator (demodulator/Forward Error Correction (FEC) decoder) 410R to demodulate the signal and to decode the error correction data, an IR receiver 412R for receiving IR remote control commands, a microprocessor 415R, which operates interactively with demodulator/FEC unit 410R, and a transport unit 420R to transport the signal to an appropriate decoder 430R within unit 400R depending on the content of the signal, i.e., audio or video information. An NTSC Encoder 440R encodes the decoded signal to a format suitable for use by signal processing circuits in a standard NTSC consumer VCR 402 and standard NTSC consumer television receiver 403. Microprocessor (or microcontroller, or microcomputer) 415R receives infrared (IR) control signals from remote control unit 450R, and sends control information to VCR 402 via an IR link 418R. Microprocessor 415R also generates the on-screen display (OSD) signals needed for presenting the interactive sentence, or confirmation sentence, to the user. Microprocessor 415R also receives and interprets cursor key X and Y information in order to control the highlighting of user choices in the on-screen displays.

The routine for automatic generation of the predictive list is set forth in FIG. 5. The routine is entered at step 500, and at step 520, a search of the newly received program guide is performed for a match with search terms in the viewed item list of FIG. 2. Note that the additional program descriptive data 120 of FIG. 1 is also to be search for a correspondence with the search terms of FIG. 2. The search routine loops at step 525 until completed. At step 530, the list is weighted for display. The list of items predicted to be of interest to the viewer is then displayed at step 535, and the program exited at step 540.

Figure 6B:
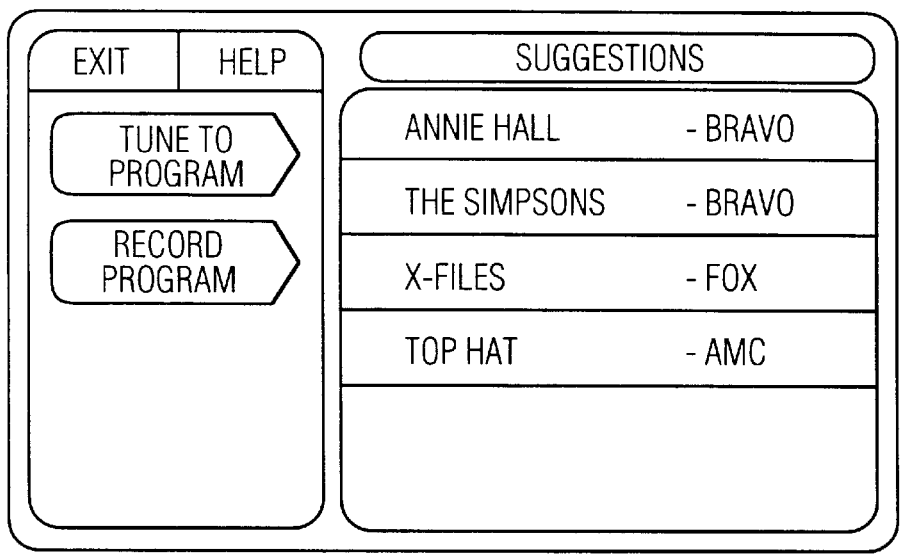
Figure 6C:
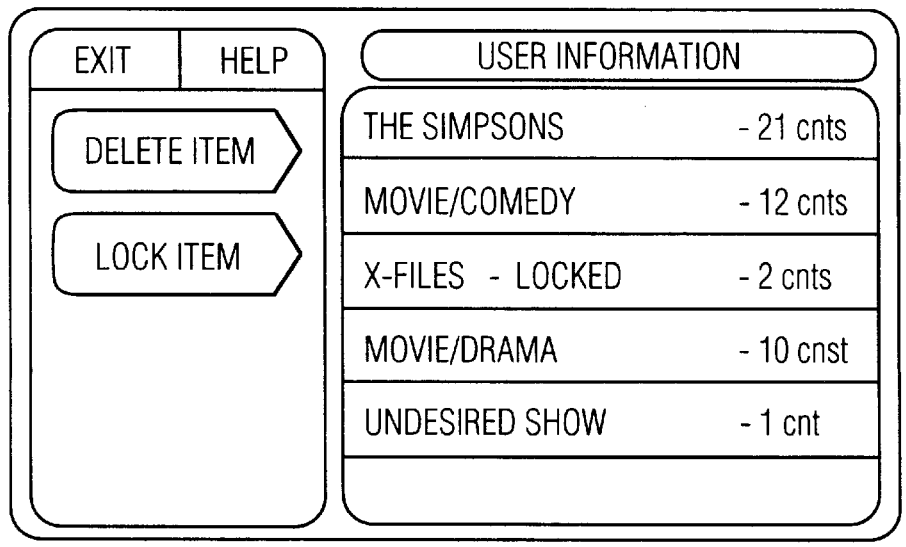

FIGS. 6a–6c show screen displays which enable the user to exercise the features of the invention. Specifically, FIG. 6a is a Predictive Agent Main Menu screen accessed for example via the normal hierarchical menu system of the DSS® satellite television system. The screen display of FIG. 6a has two "softkeys" labelled "Request a Suggestion" and "Edit User Information", respectively. Selecting "Request a Suggestion" causes a prediction operation to be performed, and brings up the screen display of FIG. 6b. FIG. 6b shows the predictions to the user, for example the movie Annie Hall on the Fox channel leads a list of shows predicted to be of interest to this particular viewer. The viewer may highlight one of the items on the list and then either tune to that show or record it. The other choice in the screen display of FIG. 6a is "Edit User Information". Suppose the viewer had watched a show called (for purposes of this explanation) "Undesired Show". Further suppose that the viewer did not enjoy the show and does not want that show to influence future predictions. By selecting the "Edit User Information" softkey, the screen of FIG. 6c is brought up for display. The viewer may then highlight the entry for "Undesired Show" and delete it by pressing the "Delete Item" softkey. As noted above, the viewer may also lock a desired entry to keep it from being automatically deleted when space is needed, if that item has a low count, or hasn't been watched recently.

Although the invention was described with reference to a satellite television system, it is equally applicable to ground based television broadcast systems, both digital and analog.

We claim:

1. A television program searching method in a television system in which at least program title information for programs which are to be transmitted in the future is transmitted in advance to form a channel guide list, comprising the steps of:

storing in a memory means data representing said channel guide list and storing data representing characteristics of television programs previously watched by a user;

performing a search of said channel guide list for a match to specific data representing said characteristics of television programs previously watched by said user; and notifying said user of available television programs having characteristics similar to characteristics of a previously watched television program.

2. The method of claim 1 wherein, when television program-descriptive text accompanies said channel guide list, includes the further step of:

performing a search of said television program-descriptive text for a particular text string which relates to at least one of title, star, director, or context of said television program.

3. The method of claim 1, wherein said step of notifying said user includes the step of producing a display including a list of the available television programs matched during said step of performing a search on a display screen for viewing by the user.

4. The method of claim 3, further comprising a step of altering the produced display by a user using a data entry device.

5. The method of claim 4, further comprising the step of selecting one of the available television programs displayed on the list of available television programs.

6. The method of claim 1, wherein said specific data representing said characteristics of television programs previously watched by said user includes at least one of topic, title, date and theme information.

7. The method of claim 5, further comprising steps of:

determining if a predetermined time period elapses between completion of said step of selecting and entering of user-entered data; and modifying the display based upon the selected one of the available television programs upon determining the predetermined time period has expired.

8. The method of claim 4, further comprising a step of displaying a number of times that each of the available television programs has been viewed.

9. The method of claim 8, wherein said step of displaying further comprises the step of displaying instructions for recording the selected one of the available television programs displayed on the list of available television programs.

* * * * *